(12) United States Patent
Yaffe

(10) Patent No.: US 12,739,128 B2
(45) Date of Patent: Sep. 15, 2026

(54) METHOD OF VERIFYING ORIGIN OF A SIGNED FILE

(71) Applicant: Jelurida IP B.V., Amsterdam (NL)

(72) Inventor: Lior Mordechai Yaffe, Hadera (IL)

(73) Assignee: Jelurida Swiss SA, Lugano (CH)

( * ) Notice: Subject to any disclaimer, the term of this patent is extended or adjusted under 35 U.S.C. 154(b) by 224 days.

(21) Appl. No.: 17/501,594

(22) Filed: Oct. 14, 2021

(65) Prior Publication Data

US 2022/0141033 A1 May 5, 2022

(30) Foreign Application Priority Data

Oct. 15, 2020 (NL) ..................................... 2026685
Oct. 15, 2020 (NL) ..................................... 2026686

(51) Int. Cl.
*H04L 29/06* (2006.01)
*H04L 9/08* (2006.01)
*H04L 9/32* (2006.01)
*H04L 67/06* (2022.01)

(52) U.S. Cl.
CPC .......... *H04L 9/3247* (2013.01); *H04L 9/0825* (2013.01); *H04L 9/3268* (2013.01); *H04L 9/3297* (2013.01); *H04L 67/06* (2013.01)

(58) Field of Classification Search
None
See application file for complete search history.

(56) References Cited

U.S. PATENT DOCUMENTS 8,875,285 B2 * 10/2014 Cross ...................... G06F 21/51 726/22
9,455,994 B1 * 9/2016 Raman .................. H04L 63/145
9,860,230 B1 * 1/2018 Sobel ...................... G06F 21/33
11,170,370 B1 * 11/2021 Balakrishnan ......... G06Q 20/02
11,783,062 B2 * 10/2023 Lounsberry ......... G06F 21/6218 726/30
2005/0160272 A1 * 7/2005 Teppler ..................... H04L 9/12 713/178
2008/0028100 A1 * 1/2008 Adelman ............. G06Q 10/107 709/245
2015/0278779 A1 * 10/2015 Pfeifer .............. G06Q 30/0279 705/39

(Continued)

FOREIGN PATENT DOCUMENTS

WO 2004105311 A1 12/2004

*Primary Examiner* — Ali H. Cheema
*Assistant Examiner* — Hassan A Hussein
(74) *Attorney, Agent, or Firm* — Banner & Witcoff, Ltd.

(57) ABSTRACT

Methods are provided for generating a certificate, signing files with the certificate and verifying the signing. A first aspect provides, in an electronic data processing device, a method of processing a data file. The method comprises associating a certificate to a data file, the certificate comprising at least one reputation service identifier, signing the data file using a private key associated with the certificate, generating a file identifier based on data comprised by the data file and sending the file identifier to a trusted data vault associated with the certificate. The method further comprises generating a data file token based on the file identifier, signing the data file token with the private key and sending the token to the reputation service for publication associated with the reputation service identifier.

19 Claims, 5 Drawing Sheets

(56) References Cited

U.S. PATENT DOCUMENTS

| | | | | |
|---|---|---|---|---|
| 2015/0350198 | A1* | 12/2015 | Li | G06F 21/645<br>713/156 |
| 2016/0142383 | A1* | 5/2016 | Asano | H04L 9/3265<br>713/168 |
| 2017/0004582 | A1* | 1/2017 | Engström | G06Q 40/03 |
| 2017/0019400 | A1* | 1/2017 | Drolshagen | H04L 63/0861 |
| 2017/0078299 | A1* | 3/2017 | Castinado | G06F 21/34 |
| 2017/0147808 | A1* | 5/2017 | Kravitz | H04L 9/3268 |
| 2018/0077146 | A1* | 3/2018 | Lonas | B66B 7/02 |
| 2018/0357683 | A1* | 12/2018 | Pickover | G06Q 30/0282 |
| 2019/0042707 | A1* | 2/2019 | Young | G06F 21/604 |
| 2019/0245848 | A1* | 8/2019 | Divoux | H04L 63/0815 |
| 2019/0325532 | A1* | 10/2019 | Torrenegra | G06Q 10/1053 |
| 2020/0117656 | A1* | 4/2020 | Royyuru | G06F 16/2379 |
| 2020/0151278 | A1* | 5/2020 | Seida | G06Q 10/40 |
| 2020/0313897 | A1* | 10/2020 | Heath | G06F 16/1824 |
| 2020/0322131 | A1* | 10/2020 | Sundaresan | H04L 9/14 |
| 2020/0328890 | A1* | 10/2020 | Connor | G06Q 20/223 |
| 2021/0083882 | A1* | 3/2021 | Venable, Sr. | H04L 9/3268 |
| 2021/0112063 | A1* | 4/2021 | Castinado | G06Q 20/385 |
| 2021/0385085 | A1* | 12/2021 | Wang | H04L 63/0421 |
| 2022/0103681 | A1* | 3/2022 | Prodanovic | H04L 67/00 |
| 2022/0191047 | A1* | 6/2022 | Irazabal | H04L 9/3239 |
| 2023/0419304 | A1* | 12/2023 | Cella | G06F 21/10 |
| 2026/0046317 | A1* | 2/2026 | Crabtree | H04L 63/104 |

* cited by examiner

METHOD OF VERIFYING ORIGIN OF A SIGNED FILE

CROSS-REFERENCE TO RELATED APPLICATIONS

This application claims priority to Dutch patent application NL 2026685, filed Oct. 15, 2020 and to Dutch patent application NL 2026686, filed Oct. 15, 2020, the contents of each of these prior applications being incorporated by reference in their entireties.

TECHNICAL FIELD

The various aspects and implementations thereof relate to the field of electronic certification and signing of electronic files and verification of that certification and signing.

BACKGROUND

Certificate Authorities provide identity on the network. A Certificate Authority can be considered as a publicly trusted notary that acts as an anchor of trust among multiple parties. All entities in the network are given a certificate signed by a root Certificate Authority that encapsulates their digital identity. This certificate is the root of trust for all the signing and verification operations that are performed on the network.

Individual certificates issued by software developers and document signers are bundled into a CSR (Certificate Signing Request) and submitted to the Certificate Authority for approval. Once approved, the Certificate Authority forms a certificate chain leading from the individual certificate up to the Certificate Authority trust root. This certificate chain is imported into the individual key store and used for signing code packages and documents. Documents signed using a private key and a valid certificate chain can be later verified by standard software such as operating systems and browsers which validate the certificate chain.

SUMMARY

Certificate Authorities represent a single point of failure. A hacked or defaced Certificate Authority enables widespread issuance of fake certificates which can be used for various nefarious purposes while bypassing common security checks. Therefore, it is preferred to provide a broader supported system for verification of data files that are certified.

A first aspect provides, in an electronic data processing device, a method of processing a data file. The method comprises associating a certificate to a data file, the certificate comprising at least one reputation service identifier, signing the data file using a private key associated with the certificate, generating a file identifier based on data comprised by the data file and sending the file identifier to a trusted data vault associated with the certificate. The method further comprises generating a data file token based on the file identifier, signing the data file token with the private key, and sending the token to the reputation service for publication associated with the reputation service identifier.

By signing a data file in accordance with this aspect, a user is able to verify correct signing of the file by generating a file identifier of the data file himself. The identifier thus obtained by the user, for example by generating a hash code of the file, may be checked with the identifier posted to the reputation service as well as with the trusted data vault. The reputation service may, in a particular implementation, be a social media platform to which the identifier is, upon signing, posted associated with the reputation service identifier—a username of a social media platform. Based on a number of connections, a number of credits to the post with the file identifier, other, or a combination thereof, a level of trust may be provided to the posted file identifier which may be used for verification of the signing.

An implementation further comprises appending the certificate to the data file, prior to at least one of signing the data file and generating the file identifier. In this way, the data in the certificate is considered when signing or generating the file identifier. The certificate may also be appended after signing and/or after generating the file identifier.

Another implementation further comprises further comprising sending a public key associated with the private key to the trusted data vault. This allows third parties to retrieve the public key for verifying the signature.

A further implementation comprises sending a public key associated with the private key to the reputation service, preferably associated with the token. This allows third parties to retrieve the public key for verifying the signature.

Again another implementation further comprises associating a timestamp with the token. This implementation provides a further option for verification of integrity of the file and the identifiers posted to the reputation services.

Yet a further implementation comprises sending at least one of the file identifier and the data file token to the trusted data vault, receiving, in response to the sending, a transaction timestamp; and associating the transaction timestamp with the token. A trusted data vault, in a particular implementation a blockchain, uses a trusted timekeeping system. With such system being trusted, it may be used for obtaining a reliable trustworthy timestamp which may be used for verification.

In again a further implementation, the trusted data vault is a blockchain account.

In particular in this directly previous implementation, the blockchain account is associated to the certificate by the certificate comprising an alias identifying the blockchain account. This implementation allows the data for verification to be retrieved from the blockchain using the alias readily available in the certificate appended to the file.

The various implementations discussed in conjunction with the first aspect may be applied to the first aspect in general, either individually as in any combination with one or more variations of the implementations as discussed above.

A second aspect provides, in an electronic data processing device, a method of verifying an origin of a data file. The method comprises retrieving a certificate from the data file, the certificate comprising a reputation service identifier, retrieving a data file token from a reputation service, the data file token being associated with the reputation service identifier, retrieving a public key from a trusted data vault associated with the certificate and verifying the token with the public key. This aspect provides an efficient way of verifying a certificate and signing of a file as processed in accordance with the first aspect.

An implementation further comprises generating a first file identifier based on data comprised by the data file, wherein retrieving the data file token further comprises searching the reputation service for the first file identifier. This implementation provides an efficient check mechanism; if the identifier generated based on the file does not exist with the identified reputation server, the identifier of the file is not available—and does not match the earlier posted identifier. This may mean that the identifier generated by the user based on the file does not match the identifier posted earlier by the party who posted the signed file identifier on the reputation service or that the post has been removed. Either way, the signing of the file and the certificate have not been verified in such case.

Another implementation further comprises retrieving a further reputation service identifier from the trusted data vault. The certificate may comprise out of date reputation services or the producer of the software may later on rely on new reputation services. In implementation that includes retrieving data from the trusted data vault, data in the trusted data vault may be regularly updated with new reputation services.

Again another implementation further comprising retrieving, from the reputation service, a reputation strength value associated with the reputation service identifier. In a particular implementation based thereon, the reputation strength value is at least one of credits associated with the identifier and credits associated with the data file token. Such credits may, optionally, be followers associated with the reputation service identifier or 'likes' associated with the posting of the token. The more credits, the more credible the reputation service account associated with the reputation service identifier may be or the more reliable the posted token may be.

In yet another implementation, the trusted data vault is a blockchain account. Blockchain technology has proven its reliability, thus providing a known and efficient option to implement a trusted data vault.

The various implementations discussed in conjunction with the second aspect may be applied to the second aspect in general, either individually as in any combination with one or more variations of the implementations as discussed above.

A third aspect provides, in an electronic data processing device, a method of registering a certificate. The method comprises generating a certificate, adding at least one reputation service identifier to the certificate, obtaining a trusted data vault alias associated with the certificate and preferably identical to the certificate alias and sending a public key associated with the certificate to the trusted data vault.

This aspect provides a method of registering a certificate such that the methods of the previous aspects may be implemented.

An implementation of the third aspect further comprises sending the certificate to the trusted data vault. This option allows a trusted copy of the certificate to be retrieved by a user for comparing a certificate to a file to the trusted copy.

Another implementation further comprises sending reputation service identifier to the trusted data vault. This option allows for updating the set of reputation services that may be used for posting the token, without a need to constantly update certificates.

In a further implementation, the trusted data vault is a blockchain account. This implementation allows to use the blockchain, with advantages as discussed above.

The various implementations discussed in conjunction with the third aspect may be applied to the third aspect in general, either individually as in any combination with one or more variations of the implementations as discussed above.

A fourth aspect provides a data processing device comprising a processor configured to perform the method according to the first aspect.

A fifth aspect provides a computer program product comprising instructions which, when the program is executed by a computer, cause the computer to carry out the method according to the first aspect.

A sixth aspect provides a data processing device comprising a processor configured to perform the method according to the second aspect.

A seventh aspect provides a computer program product comprising instructions which, when the program is executed by a computer, cause the computer to carry out the method according to the second aspect.

An eight aspect provides a data processing device comprising a processor configured to perform the method according to the third aspect.

A ninth aspect provides a computer program product comprising instructions which, when the program is executed by a computer, cause the computer to carry out the method according to the third aspect.

BRIEF DESCRIPTION OF THE DRAWINGS

The various aspects and implementations thereof will now be discussed in further detail in conjunctions with drawings. In the figures.

FIG. 4 B shows a second part of a third flowchart;

DETAILED DESCRIPTION

Figure 1:
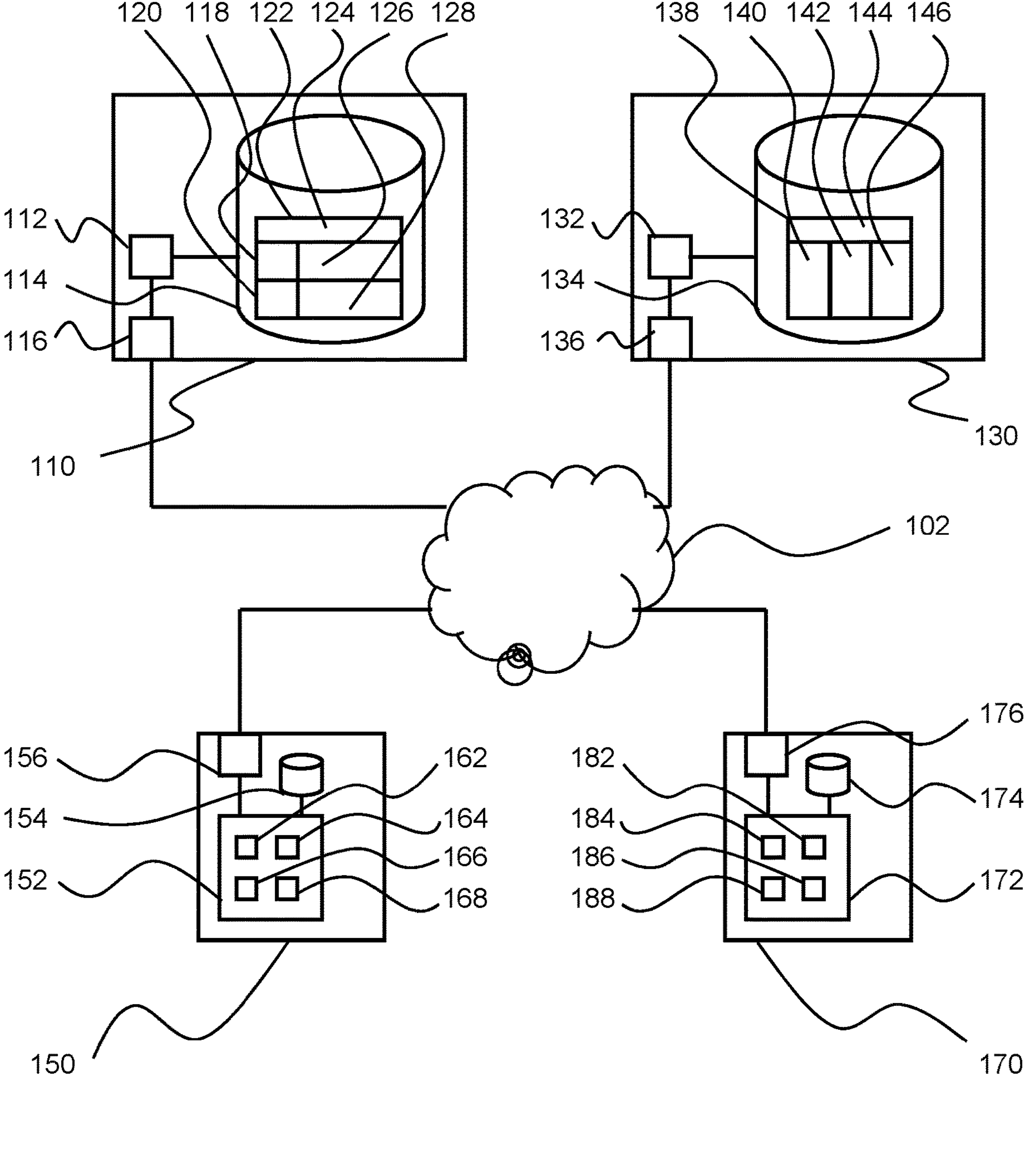
FIG. 1 shows a system for signing and verification.

FIG. 1 shows a system 100 for generating a certificate, signing software with the certificate and for verifying signing of files with the certificate. The system 100 comprises a reputation service server 110, a blockchain server 130 as a trusted vault server, a signatory server 150 and a verification server 170. The various servers are connected via a network 102. The network 102 may be a wired network, a wireless network or a combination thereof. The network 102 may be a public network like the Internet, a private network or a combination thereof. As such the network 102 may comprise many components to route or switch data network traffic between the four servers depicted by FIG. 1 or many more computers or other electronic data processing devices.

The reputation service server 110 hosts a social media platform as an implementation of a reputation service. The reputation service server 110 comprises a reputation processing unit 112, a reputation storage module 114 and a reputation communication module 116. The reputation processing unit 112 is arranged to control the various part of the reputation service server 110 and to aid at execution at least part of at least some of the procedures outlined below or variations thereof. The reputation communication module 116 is arranged to communicate with other devices connected to the network 102.

The reputation storage module 114 is arranged to store data related to the social media platform and data for programming the reputation processing unit 112. In particular, the reputation storage module 114 stores a reputation data table 122 comprising a header 124 for storing reputation identifier data related to a user of the social media platform, a first data field 118 for storing a first social media post, a first reputation score field 126 for storing a reputation score related to the first social media post—for example a number of "followers"—, a second data field 120 and a second reputation score field 128. The reputation service server 110 is depicted as a single device, though it may also be implemented as a set of devices, either provided at a single location or multiple locations.

The blockchain server 130 is arranged for operating a blockchain. The skilled person will realise that a blockchain is mostly distributed over multiple devices with respect to storage and operation. For the description of the various aspects and embodiments thereof below, this distributed character of a blockchain is simplified to a single device, with a single block; for more information on operation of a blockchain, the skilled person has many sources for general knowledge at her or his disposal.

The blockchain server 130 comprises a blockchain processing unit 132, a blockchain storage module 134 and a blockchain communication module 136. The blockchain processing unit 132 is arranged to control the various part of the blockchain server 130 and to aid at execution at least part of at least some of the procedures outlined below or variations thereof. The blockchain communication module 136 is arranged to communicate with other devices connected to the network 102.

The blockchain storage module 134 is arranged to store data related to the blockchain and data for programming the blockchain processing unit 132. In particular the blockchain storage module 134 stores a data block 138. The data block 138 comprises an account header 144 for storing a blockchain alias related to a user of the blockchain service and a first account data field 140, a second data field 142 and a third data field 146 for storing data related to a blockchain account of the user identifiable by means of the blockchain alias. As discussed, the blockchain server 130 and the blockchain storage module 134 may comprise more components and more data for operating the blockchain, preferably in a distributed manner; the description provided here is merely simplified to identify elements for describing the various aspects and implementations thereof.

The signatory server 150 is arranged for signing files and executable software in particular, though it may also be used for signing documents. The signatory server 150 comprises a signatory processing unit 152, a signatory storage module 154 and a signatory communication module 156. The signatory storage module 154 is arranged for storing data to be processed and/or which has been processed by the signatory processing unit 152 and/or data for programming the signatory processing unit 152 to execute methods according to various aspects and implementations thereof. The signatory communication module 156 is arranged for communication between the signatory server 150 and various other parts of the system 100.

The signatory processing unit 152 is in this implementation provided with a certificate generation unit 162 arranged to generate a certificate, a certification unit 164 arranged to provide a certificate to a file, a signing unit 166 arranged to electronically sign a file and a posting unit 168 for posting certificates, keys, aliases, reputation identifiers, tokens and other files to various other servers connected to the network 102. The functionality of these units will be discussed below. The units may be programmed by means of software and/or hardcoded in the signatory processing unit 152.

The verification server 170 is arranged for verifying a certificate appended to or otherwise associated with a file and an executable software file in particular. The verification server 170 may also be arranged for executing software of the executable software file, in particular if the certificate and the identity of the certificate issuing party and/or signing party has been verified. The verification server 170 comprises a verification processing unit 172 for controlling the various parts of the verification server 170 and for aiding in execution of method according to the various aspects or implementations thereof.

The verification processing unit 172 is in this implementation provided with a certificate extraction unit 182, a hash calculation unit 184, a comparison unit 186 and a notification unit 188. The functionality of the various sub-units of the verification processing unit 172 will be discussed in detail below.

The verification server 170 further comprises a verification storage module 174 arranged for data to be processed and/or processed by verification processing unit 172 and/or data for programming the verification processing unit 172 and the verification server 170 comprises a verification communication module 176 arranged for communication between the verification server 170 and various other parts of the system 100.

Figure 2:
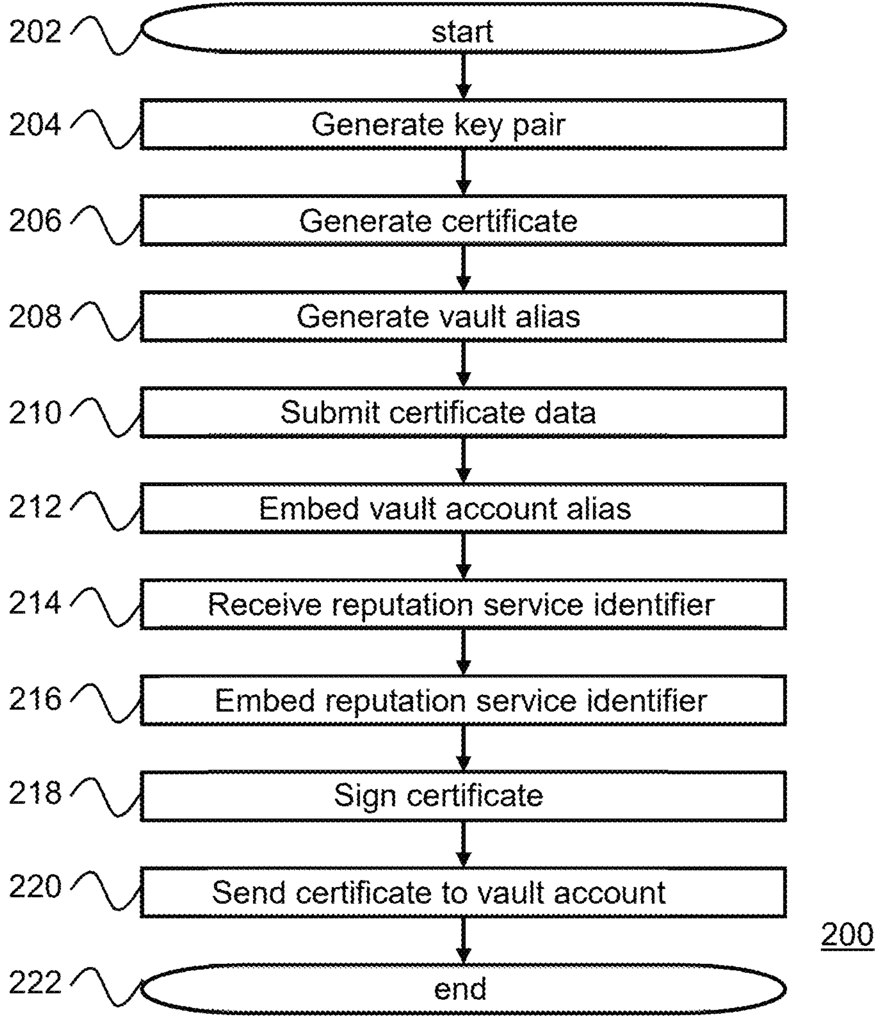
FIG. 2 shows a first flowchart.

The functionality of the various servers of the system 100 will be discussed below in further detail in conjunction with various flowcharts. FIG. 2 shows a first flowchart 200; the list below provides brief summaries of the functionality of parts of the second flowchart 200.

202 Start procedure
204 Generate key pair
206 Generate certificate
208 Generate vault alias
210 Submit certificate data to vault account
212 Embed vault account alias in certificate
214 Receive reputation service identifier
216 Embed reputation service identifier in certificate
218 Sign certificate with private key
220 Send certificate to vault account
222 End procedure Most of the parts of the first flowchart 200 are executed by the signatory server 150. Alternatively, they are executed by another electronic data processing device. The process depicted by the first flowchart starts in terminator 202 and proceeds to step 204 in which a key pair is generated; a key pair comprises a private key and a public key to be associated with a certificate. In step 206, a certificate is created and associated with the private key and the public key, for example by the certificate generation unit 162. In step 208, instructions for creating a blockchain alias are sent out to the blockchain server 130. The creation of such alias is preferably executed using the Ardor software, on the Ardor blockchain, using the private key that has been generated.

In step 210, certificate data is submitted to the blockchain, which certificate data may comprise the public key, other data associated with the party related to the alias or a combination thereof. In step 212, the blockchain alias is embedded in the certificate, which makes the data associated with it in the blockchain identifiable by a party receiving the certificate.

In step 214, the signatory server 150 or another computer generating the certificate receives a reputation service identifier. The reputation service identifier may be a username or a nickname for a social media platform or service like LinkedIn®, TikTok®, Facebook®, Instagram®, Snapchat®, Reddit®, Pinterest®, Tinder®, Twitter®, Grindr®, VK®, WeChat® and the like. Reputation services are not limited to social media platforms, but may also be a third party reputation service like Dun & Bradstreet, a government managed database, a specific URL of a website hosted within a domain of the signing party, other, or a combination thereof. The reputation service identifier may be present on the signatory server 150, may be received from a user via one or more user input device connected to the signatory server 150, other, or a combination thereof.

In step 216, the received reputation service identifier, optionally with an identifier of the applicable reputation services, are appended to the certificate. In step 218, the certificate is signed using the private key generated earlier and in step 220, the signed certificate is submitted to the blockchain, using the earlier generated blockchain account linked to the unique alias associated with the certificate. Next, the procedure ends in step 222.

Figure 3:
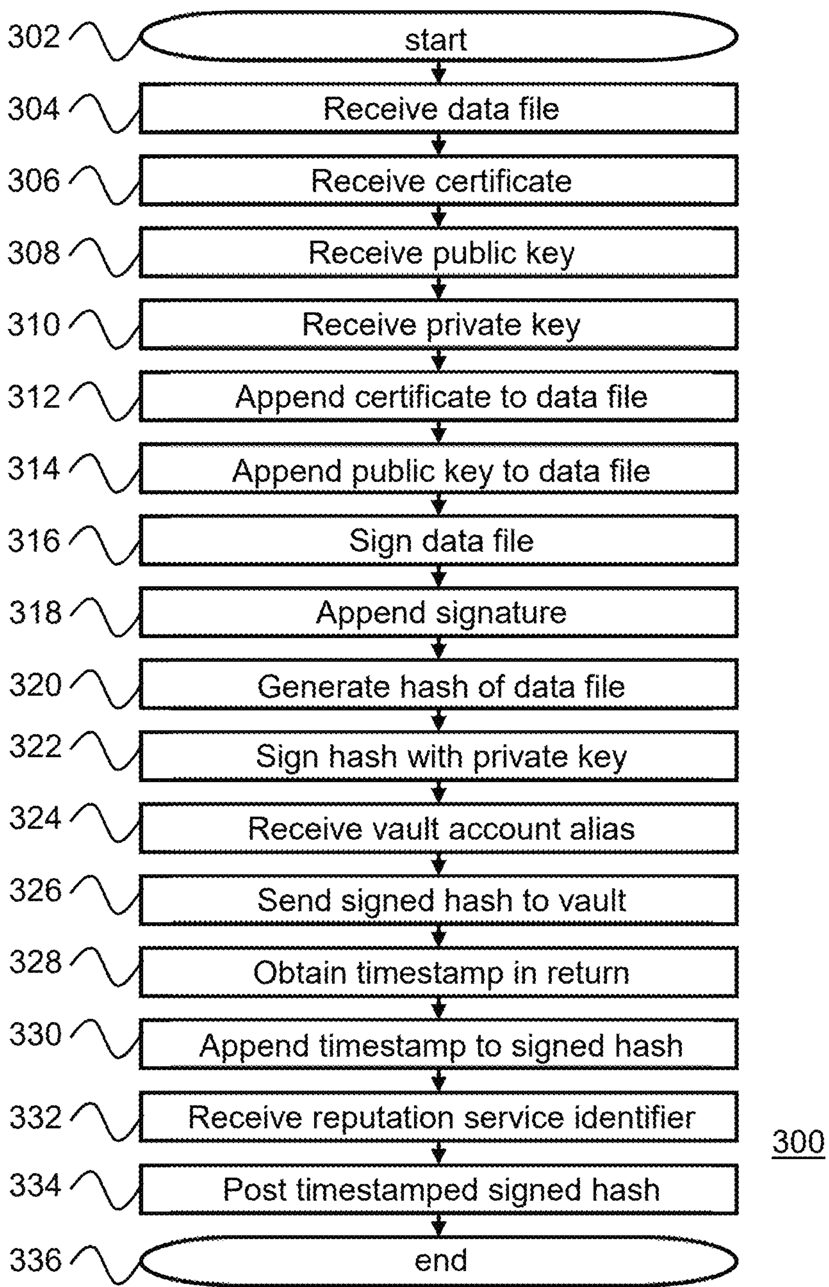
FIG. 3 shows a second flowchart.

FIG. 3 shows a second flowchart 300, depicting a procedure for certifying a file by associating the certificate with a file and providing proof of proper certification to a reputation service. The list below provides brief summaries of the various parts of the second flowchart 300. The procedure is preferably executed by the signatory server 150.

302 Start procedure
304 Receive data file
306 Receive certificate
308 Receive public key
310 Receive private key
312 Append certificate to data file
314 Append public key to data file
316 Sign data file
318 Append signature
320 Generate hash of data file
322 Sign hash with private key
324 Receive vault account alias
326 Send signed hash to vault
328 Obtain timestamp in return
330 Append timestamp to signed hash
332 Receive reputation service identifier
334 Post timestamped signed hash to reputation service using identifier
336 End procedure The procedure starts in a terminator 302 and proceeds to step 304 in which a data file is received that is to be associated with the certificate created earlier. The data file may be one particular file, multiple files or an archive file comprising multiple single files, like a zip file. In particular implementation, the file is a Java Jar file. In step 306, the certificate to which the data file is to be associated is received. In step 308, the public key of the key pair generated earlier, associated with the received certificate, is received. In step 310, the private key of the key pair generated earlier, associated with the received certificate, is received.

In step 312, the certificate is appended to the file to be certified by the certification unit 164 and in step 314, the public key is appended to the file to be certified. In case the public key is included in the certificate already appended, this step may be omitted. In step 316, the data file is signed by the signing unit 166 and in step 318 the signature is appended to the file. Subsequently, a hash is generated of the data file with certificate and signature in step 320. In other implementations, the hash may be generated prior to appending the certificate and/or signature. The hash is preferably an SHA256 hash. Alternatively or additionally, other ways of providing a file identifier may be generated, like a fingerprint or a checksum.

The hash is signed using the private key in step 322 by the signing unit 166, yielding a 100 byte file; 32 bytes of the SHA256 hash and 64 bytes signature data and 4 bytes timestamp representing the time passed in seconds since the generation of the blockchain Genesis block. In step 324, the blockchain alias is received, which blockchain alias is associated with the certificate used for signing. This alias is used in step 326, in which the signed hash is submitted to the blockchain using the private key associated with the blockchain alias which may also be written to the certificate. The hash is submitted using a message transaction by the posting unit 168, via the signatory communication module 156. Optionally, meta-data is provided about the file signed.

In return, a transaction timestamp of the transaction is received in step 328, noting for example time passed since generation of the blockchain genesis block. This trusted timestamp may also be generated otherwise, by another trusted timestamp source. In yet another implementation, local time of the signatory server 150 is used. The timestamp is appended to the 96 byte file in step 330 to provide a certificate transaction token.

In step 332, one or more reputation service identifiers as discussed above are received. Using the identifier or identifiers, the certificate transaction token is submitted to reputation service in step 334, like a social media platform as discussed above, or another reputation service, by the posting unit 168, via the signatory communication module 156. In particular on a social media platform, the token is posted as a message. This allows for searching of the hash—embedded in the token—using the same data—hash—obtained from another source, using the reputation service identifier that is associated with the certificate. The certification procedure as depicted by the second flowchart provided by FIG. 3 ends in a terminator 336.

Figure 4:
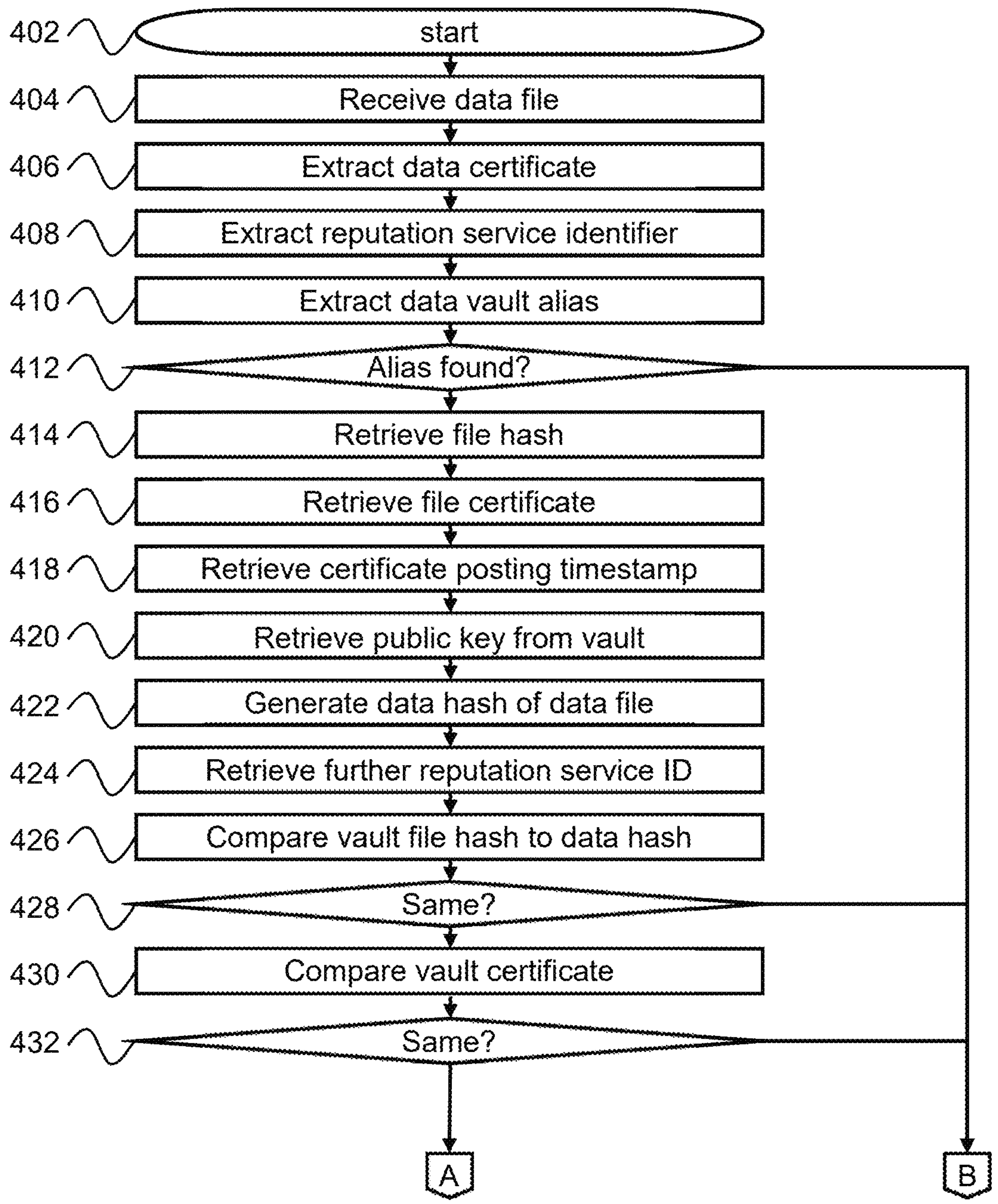
FIG. 4 A shows a first part of a third flowchart.
Figure 4:
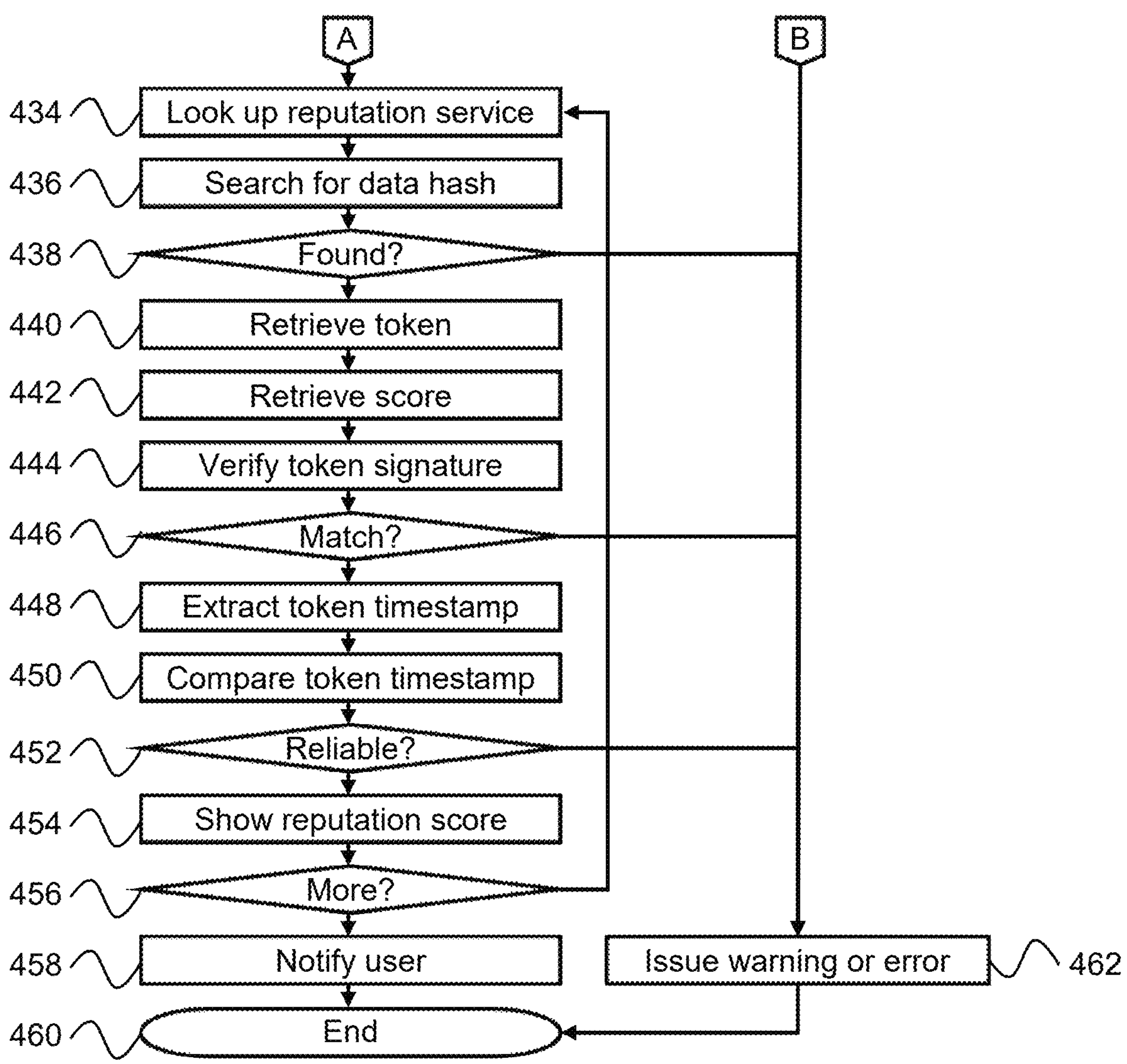

FIG. 4 A and FIG. 4 B show a third flowchart 400, depicting a procedure for verifying a certificate associated with a file using data stored earlier in a trusted vault like a blockchain and data submitted to a reputation service like a social media platform. The list below provides brief summaries of the various parts of the third flowchart 400. The procedure is preferably executed by the verification server 170.

402 Start procedure
404 Receive data file
406 Extract data certificate
408 Extract reputation service identifier
410 Extract data vault alias
412 Vault alias found in vault?
414 Retrieve file hash from vault
416 Retrieve file certificate from vault
418 Retrieve certificate posting timestamp from vault
420 Retrieve public key from vault
422 Generate data hash of data file
424 Retrieve further reputation service identifier from vault
426 Compare vault file hash to data hash
428 Same?
430 Compare vault certificate to data certificate
432 Same?
434 Look up reputation service
436 Search reputation service for data hash
438 Found?
440 Retrieve token
442 Retrieve reputation score
444 Verify token signature to public key
446 Match?
448 Extract token timestamp from token
450 Compare token timestamp later than certificate posting timestamp
452 Token timestamp reliable?
454 Show reputation score with associated reputation service
456 More reputation services?
458 Notify user of verification success 460 End procedure 462 Issue warning or error message The procedure depicted by the third flowchart starts in terminator 402 and proceeds to step 404 in which the data file is received of which the certificate is to be verified. Preferably, the certificate is associated with the file as discussed above. In step 406, the certificate is extracted from the file by the certificate extraction unit 182. In case the certificate is not integrated in the file received, the certificate is obtained otherwise. In step 408, reputation service data is retrieved from the certificate, like one or more reputation server identifiers related to one or more social media platforms. In step 410, a data vault alias of a trusted vault, like a blockchain service, is obtained.

In step 412, the blockchain service is searched and in the blockchain, account associated with the data vault alias is searched. If it appears in step 412 that no account associated with the data vault alias is found in the blockchain, the process branches to step 462, in which an error message or warning message is generated and issued to a user. Subsequently, the procedure ends in terminator 460.

If an account with the data vault alias is obtained, data related to the account is search for a hash associated with the file of which the signing and certificate is to be verified is retrieved in step 414. In step 416, a certificate associated with the account associated with the data vault alias is retrieved from the blockchain. In step 418, data on submission of the certificate and/or of submission of the hash is retrieved from the blockchain. In step 420, the public key associated with the certificate is retrieved. In case this public key is provided in the certificate and the certificate has been retrieved, step 420 may be omitted. In step 422, further reputation services associated with the certificate and the hash in the vault are retrieved from the vault.

In step 424, a hash is generated of the file of which the certificate is to be verified by the hashing unit 184. In step 426, the hash obtained from the vault and identified in the vault as being related to the file and certificate of which integrity, identity or origin is to be verified is compared to the hash generated in step 424 by the comparing unit 186. The retrieved hash and the generated hash are compared in step 428. In case the hashes are not identical, the same, equivalent or do not match otherwise, the process branches to step 462, in which an error message or warning message is generated and issued to a user. Subsequently, the procedure ends in terminator 460 representing a successful certificate verification.

In case it is verified in step 426 that the hashes or other file identifiers match, the procedure proceeds to step 430, in which the certificate retrieved from the vault is compared by the comparing unit 186 to the certificate retrieved from the file of which integrity, identity or origin is to be verified. The retrieved certificate and the extracted certificate are compared by the comparing unit 186 in step 432. In case the certificates are not identical, the same, equivalent or do not match otherwise, the process branches to step 462, in which an error message or warning message is generated and issued to a user. Subsequently, the procedure ends in terminator 460.

If the certificates thus compared match, the procedure continues to step 434, in which a reputation service identified in the certificate by means of a reputation service identifier is looked up. In step 436, the reputation service account associated with an alias in the certificate is searched for a token, using the hash generated in step 424. It is noted that the hash generated by means of the signing procedure as depicted by the second flowchart 300 and submitted to reputation services comprises a hash of the file; in the file signed with certification has the same hash as the received file, the token is to be found. An exception to the latter case occurs if the reputation service is abandoned, the account has been deleted or in case the content of the file has been tampered with, after signing.

If the data hash has not been found in the reputation service, using the reputation service alias retrieved from the certificate, which is checked in step 438, the process branches to step 462, in which an error message or warning message is generated and issued to a user. Subsequently, the procedure ends in terminator 460.

If the data hash is found in the reputation service, using the reputation service alias retrieved from the certificate, the token in which the has is found is retrieved from the reputation service server 110 in step 440. In step 442, at least one of a reputation score associated with the reputation service alias, a further reputation score associated with a message or other submitted data structure in which the token has been identified or another reputation score related to the token or alias is retrieved from the reputation service server 110.

In step 444, signature in the retrieved token is verified using the public key retrieved from at least one of the certificate in the file, the certificate retrieved from the blockchain and the public key retrieved directly from the blockchain. In step 446, it is checked whether the signature provided with the hash in the retrieved token has been provided using the private key of the certificate issuer, using the retrieved public key. If the signature for the token is determined not to be valid, the process branches to step 462, in which an error message or warning message is generated and issued to a user. Subsequently, the procedure ends in terminator 460.

If the signature for the token is determined not to be valid as being signed with the proper private key, the procedure continues to step 448, in which the timestamp is extracted from the token in step 450.

In step 452, the reliability of the token is checked, based on the timestamp. In case the timestamp of the token is earlier than the signing of the file, the token is considered not to be reliable. In that case, the process branches to step 462, in which an error message or warning message is generated and issued to a user. Subsequently, the procedure ends in terminator 460. In another implementation, the timestamp of the token is only considered to be reliable if the timestamp of the token is the same as the time the hash of the file was registered in the blockchain using the associated alias.

In case the time stamp of the token differs from the time the file was signed too much, for example more than a pre-determined value, the token is considered not to be reliable. In that case, the process branches to step 462, in which an error message or warning message is generated and issued to a user. Otherwise, the token is considered to be reliable and the procedure continues to step 454.

In step 454, a message is generated on the reliability of the token, including the reputation score and the name of the reputation service. In step 456, the reputation processing unit 112 of the reputation service server 110 checks whether aliases related to other reputation services have been retrieved from the certificate or from the blockchain account. If that is the case, the procedure branches back to step 434. If no more reputation aliases of other reputation services remain and no intermediate errors have occurred, the procedure notifies the user in step 458 that verification of the certificate and the signing of the file with the certificate is correct, meaning that the file has been correctly signed and the provenance of the file has been established and presents to the verifier the reputation scoring obtained during the verification process. Next, the procedure ends in terminator 460.

Without any limitation, the various aspects and embodiments thereof relate to the following numbered examples:

1. In an electronic data processing device, a method of processing a data file, the method comprising:
   associating a certificate to the data file, the certificate comprising at least one reputation service identifier;
   signing the data file using a private key associated with the certificate;
   generating a file identifier based on data comprised by the data file;
   sending the file identifier to a trusted data vault associated with the certificate;
   generating a data file token based on the file identifier;
   signing the data file token with the private key;
   sending the token to the reputation service for publication associated with the reputation service identifier.

2. The method according to example 1, further comprising appending the certificate to the data file, prior to at least one of signing the data file and generating the file identifier.

3. The method according to any of the preceding examples, further comprising sending a public key associated with the private key to the trusted data vault.

4. The method according to any of the preceding examples, further comprising sending a public key associated with the private key to the reputation service, preferably associated with the token.

5. The method according to any of the preceding examples, wherein the reputation service is at least one of the following:
   a social media service;
   a network address associated with an entity associated with the private key; and
   a database managed by a government service.

6. The method according to any of the preceding examples, wherein the file identifier is at least one of the following:
   a hash of the data file;
   a checksum of the data file; and
   a fingerprint of the data file.

7. The method according to any of the preceding examples, further comprising associating a timestamp with the token.

8. The method according to example 7, further comprising:
   sending at least one of the file identifier and the data file token to the trusted data vault;
   receiving, in response to the sending, a transaction timestamp; and associating the transaction timestamp with the token.

9. The method according to any of the preceding examples, wherein the trusted data vault is a blockchain account.

10. The method according to example 9, wherein the blockchain account is associated to the certificate by the certificate comprising an alias identifying the blockchain account.

11. In an electronic data processing device, a method of verifying an origin of a data file, the method comprising:
   retrieving a certificate from the data file, the certificate comprising a reputation service identifier;
   retrieving a data file token from a reputation service, the data file token being associated with the reputation service identifier;
   retrieving a public key from a trusted data vault associated with the certificate; and
   verifying the token with the public key.

12. The method according to example 11, further comprising generating a first file identifier based on data comprised by the data file;
   wherein retrieving the data file token further comprises searching the reputation service for the first file identifier.

13. The method according to example 11 or 12, further comprising retrieving a further reputation service identifier from the trusted data vault.

14. The method according to any of the examples 11 to 13, further comprising retrieving, from the reputation service, a reputation strength value associated with the reputation service identifier.

15. The method according to example 14, wherein the reputation strength value is at least one of credits associated with the identifier and credits associated with the data file token.

16. The method according to any of the examples 11 to 15, wherein the trusted data vault is a blockchain account.

17 The method according to any of the examples 11 to 16, wherein the reputation service is at least one of the following:
   a social media service;
   a network address associated with an entity associated with the private key; and
   a database managed by a government service.

18. In an electronic data processing device, a method of registering a certificate, the method comprising:
   generating a certificate;
   adding at least one reputation service identifier to the certificate;
   obtaining an alias associated with a trusted data vault associated with the certificate;
   sending a public key associated with the certificate to the trusted data vault.

19 The method according to example 18, further comprising sending the certificate to the trusted data vault.

20. The method according to example 18 or example 19, further comprising sending the reputation service identifier to the trusted data vault 21. The method according to any of the examples 18 to 20, wherein the trusted data vault is a blockchain account.

22. The method according to any of the examples 18 to 21, wherein the reputation service is at least one of the following:
   a social media service;
   a network address associated with an entity associated with the private key; and
   a database managed by a government service.

23. A data processing device comprising a processor configured to perform the method of the examples 1 to 9.

24. A computer program product comprising instructions which, when the program is executed by a computer, cause the computer to carry out the method of any of the examples 1 to 9.

25. A data processing device comprising a processor configured to perform the method of the examples 11 to 17.

26. A computer program product comprising instructions which, when the program is executed by a computer, cause the computer to carry out the method of any of the examples 11 to 17.

27. A data processing device comprising a processor configured to perform the method of the examples 18 to 22.

28. A computer program product comprising instructions which, when the program is executed by a computer, cause the computer to carry out the method of any of the examples 18 to 22.

The invention claimed is:

1. A method of registering a certificate in an electronic data processing device, the method comprising:

generating the certificate and associating the certificate with a public key;

adding at least one reputation service identifier of a reputation service provider to the certificate, the reputation service identifier comprising data, which identifies the reputation service provider;

obtaining a blockchain alias identifying a blockchain account;

sending, by the electronic data processing device, certificate data including the public key to the blockchain account; and embedding the blockchain alias in the certificate, such that the certificate data in the blockchain account is identifiable to a party receiving the certificate, wherein the method further comprises:

associating the certificate to a data file;

signing the data file using a private key, the private key being associated with the certificate and being associated with the public key;

generating a file identifier, which identifies the data file based on data contained in the data file;

sending the file identifier to the blockchain account;

generating a data file token based on the file identifier;

signing the data file token with the private key; and sending the data file token to the reputation service provider for publication associated with the reputation service identifier.

2. The method according to claim 1, the method further comprising:

retrieving the certificate from the data file, the certificate comprising the reputation service identifier;

retrieving the data file token from the reputation service provider, the data file token being associated with the reputation service identifier;

retrieving the public key from the blockchain account associated with the certificate; and verifying the data file token with the public key.

3. The method according to claim 2, further comprising:

generating a first file identifier based on data comprised by the data file;

wherein retrieving the data file token further comprises searching the reputation service provider for the first file identifier.

4. The method according to claim 3, wherein the first file identifier is at least one of the following: a hash of the data file; a checksum of the data file; and a fingerprint of the data file.

5. The method according to claim 3, further comprising:

retrieving a second file identifier from the blockchain account, the second file identifier being associated with the data file; and comparing the first file identifier with the second file identifier.

6. The method according to claim 2, further comprising:

retrieving a further reputation service identifier from the blockchain account.

7. The method according to claim 2, wherein the data file token from the reputation service provider comprises a reputation service time stamp, the method further comprising:

retrieving, from the blockchain account, a time stamp associated with registering the certificate in the blockchain account; and comparing the reputation service time stamp with the time stamp associated with registering the certificate in the blockchain account.

8. The method according to claim 2, further comprising:

retrieving a second certificate from the blockchain account associated with the certificate; and comparing the certificate with the second certificate.

9. The method according to claim 2, further comprising:

retrieving, from the reputation service provider, a reputation strength value associated with the reputation service identifier.

10. The method according to claim 1, further comprising:

appending the certificate to the data file, prior to at least one of signing the data file and generating the file identifier.

11. The method according to claim 10, further comprising:

sending the public key to the reputation service provider.

12. The method according to claim 1, wherein the public key is associated with the private key.

13. The method according to claim 1, further comprising:

associating a timestamp with the data file token.

14. The method according to claim 13, further comprising:

sending at least one of the file identifier and the data file token to the blockchain account;

receiving, in response to the sending, a transaction timestamp; and associating the transaction timestamp with the data file token.

15. The method according to claim 1, further comprising:

sending the certificate to the blockchain account.

16. The method according to claim 1, further comprising: sending the reputation service identifier to the blockchain account.

17. The method according to claim 1, wherein the reputation service provider is at least one of the following: a social media service; a network address associated with an entity associated with a private key; and a database managed by a government service.

18. A data processing device comprising:

a memory; and a processor, coupled to the memory, configured to perform a method comprising:

generating a certificate and associating the certificate with a public key;

adding at least one reputation service identifier of a reputation service provider to the certificate, the reputation service identifier comprising data, which identifies the reputation service provider;

obtaining a blockchain alias identifying a blockchain account;

sending, by the electronic data processing device, certificate data including the public key to the blockchain account; and embedding the blockchain alias in the certificate, such that the certificate data in the blockchain account is identifiable to a party receiving the certificate, wherein the processor is further configured to perform the method comprising:

associating the certificate to a data file;

signing the data file using a private key, the private key being associated with the certificate and being associated with the public key;

generating a file identifier, which identifies the data file based on data contained in the data file;

sending the file identifier to the blockchain account;

generating a data file token based on the file identifier;

signing the data file token with the private key; and sending the data file token to the reputation service provider for publication associated with the reputation service identifier.

19. A non-transitory computer readable medium comprising a program of instructions that, when executed by a processor, cause the processor to perform a method comprising:

generating a certificate and associating the certificate with a public key;

adding at least one reputation service identifier of a reputation service provider to the certificate, the reputation service identifier comprising data, which identifies the reputation service provider;

obtaining a blockchain alias identifying a blockchain account;

sending, by the electronic data processing device, certificate data including the public key to the blockchain account; and embedding the blockchain alias in the certificate, such that the certificate data in the blockchain account is identifiable to a party receiving the certificate, wherein the program instructions further cause the processor to perform the method comprising:

associating the certificate to a data file;

signing the data file using a private key, the private key being associated with the certificate and being associated with the public key;

generating a file identifier, which identifies the data file based on data contained in the data file;

sending the file identifier to the blockchain account;

generating a data file token based on the file identifier;

signing the data file token with the private key; and sending the data file token to the reputation service provider for publication associated with the reputation service identifier.

* * * * *